No. 735,664. PATENTED AUG. 4, 1903.
J. F. GENT.
APPARATUS FOR DEGERMINATION AND DECORTICATION OF INDIAN CORN.
APPLICATION FILED NOV. 5, 1902.
NO MODEL. 4 SHEETS—SHEET 3.
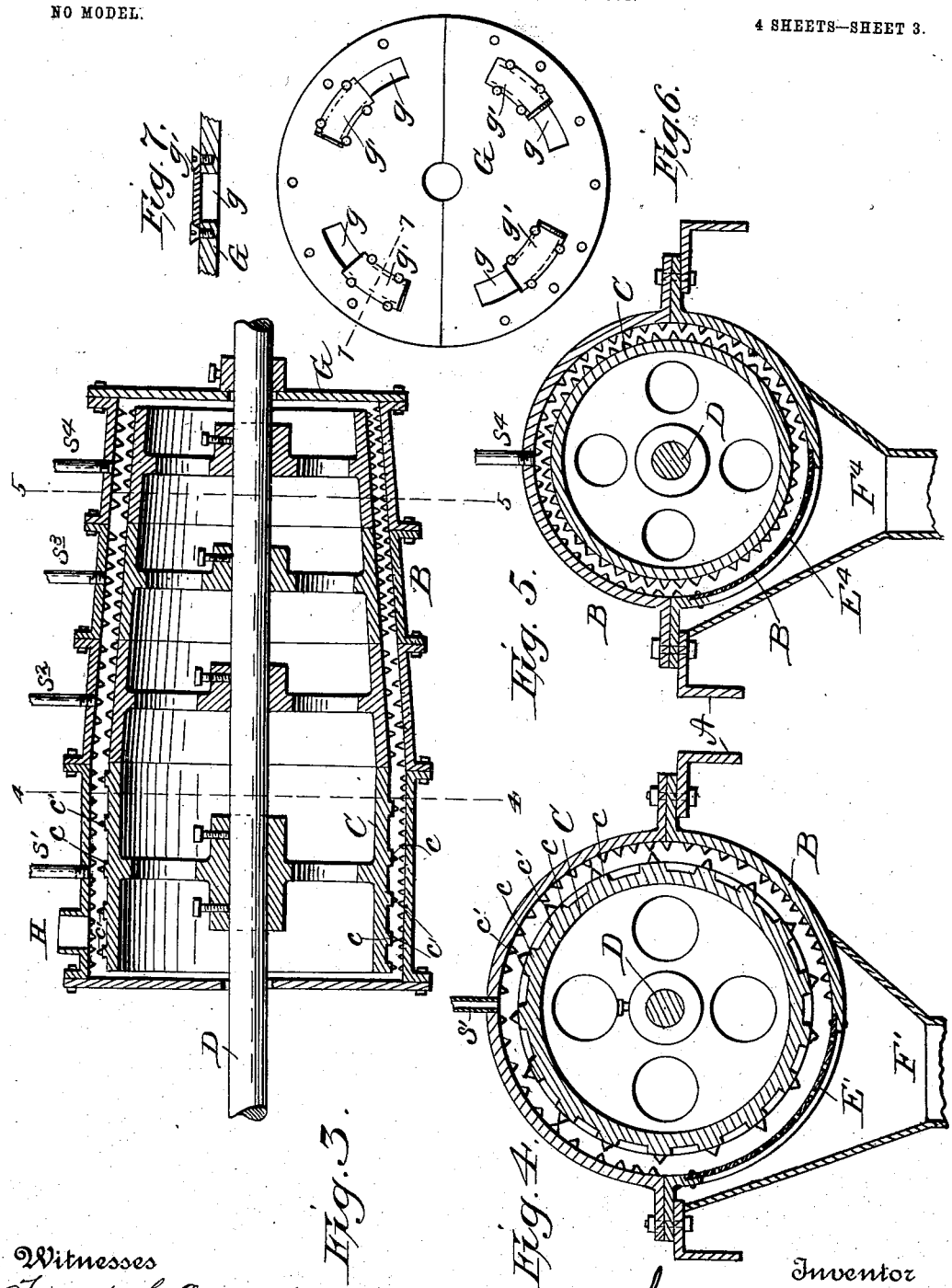

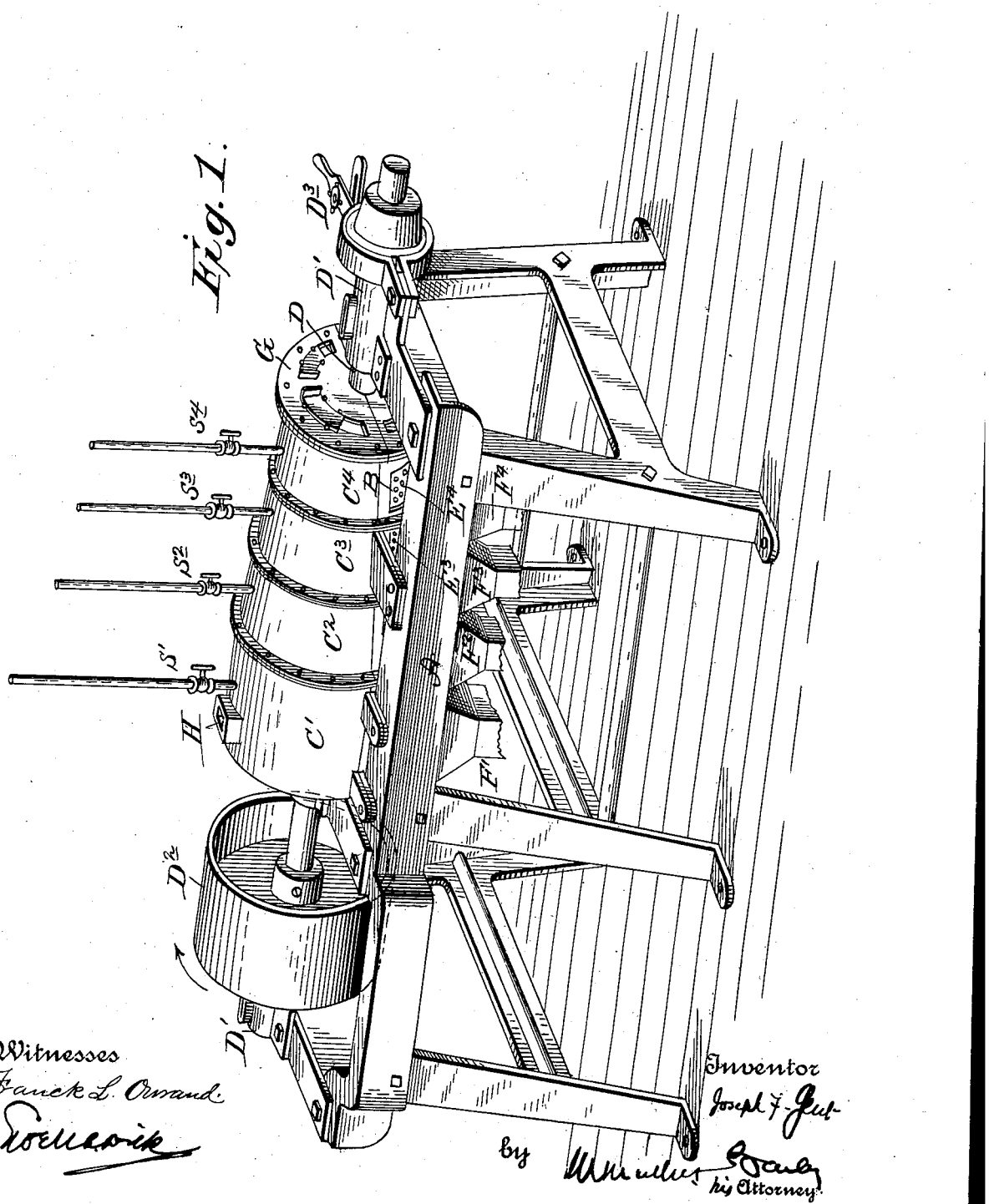

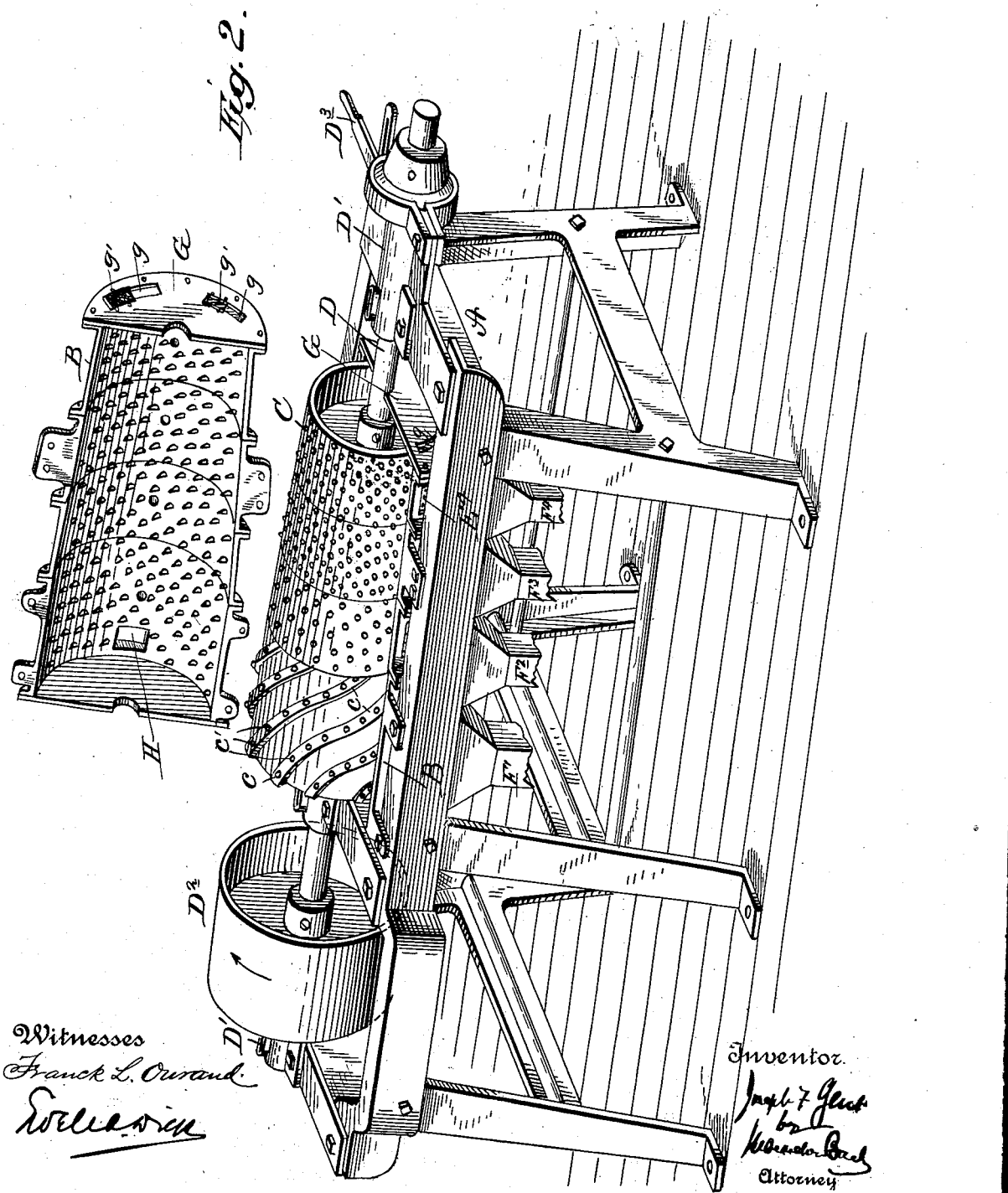

No. 735,664. PATENTED AUG. 4, 1903.
J. F. GENT.
APPARATUS FOR DEGERMINATION AND DECORTICATION OF INDIAN CORN.
APPLICATION FILED NOV. 5, 1902.
NO MODEL. 4 SHEETS—SHEET 4.
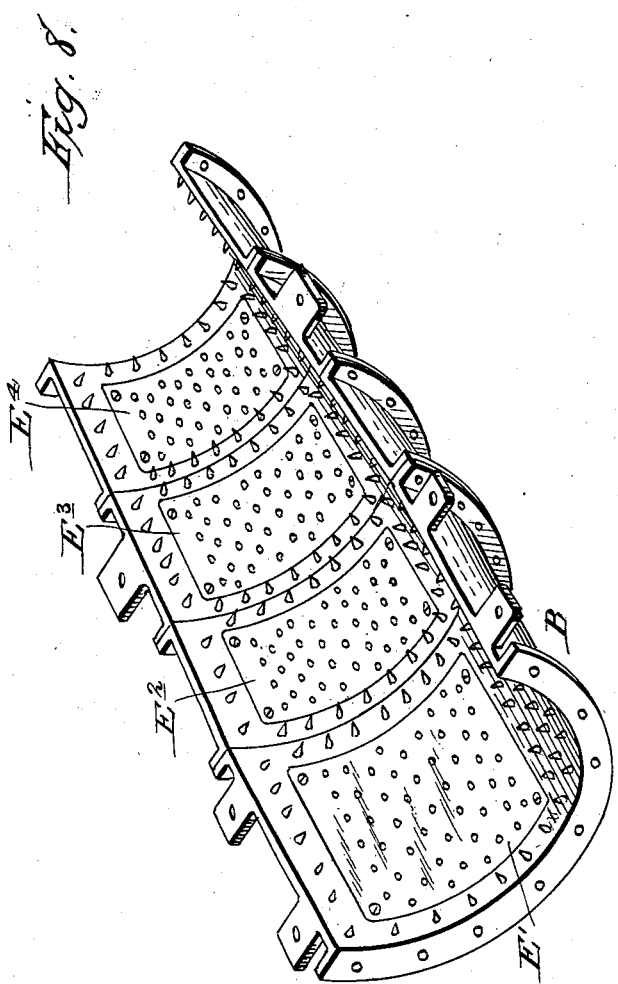

No. 735,664.　　　　　　　　　　　　　　　　　　　　Patented August 4, 1903.

UNITED STATES PATENT OFFICE.

JOSEPH F. GENT, OF MOUNT CLEMENS, MICHIGAN, ASSIGNOR OF TWO-THIRDS TO THOMAS T. GAFF, OF BARNSTABLE, MASSACHUSETTS.

APPARATUS FOR DEGERMINATION AND DECORTICATION OF INDIAN CORN.

SPECIFICATION forming part of Letters Patent No. 735,664, dated August 4, 1903.

Application filed November 5, 1902. Serial No. 130,123. (No model.)

*To all whom it may concern:*

Be it known that I, JOSEPH F. GENT, of Mount Clemens, in the county of Macomb and State of Michigan, have invented a new and useful Improvement in Apparatus for Degermination and Decortication of Indian Corn, of which the following is a specification.

In Letters Patent No. 707,058, of August 12, 1902, granted to T. T. Gaff and myself, is described a process of degerming Indian corn, which involves, among other things, subjecting the grain, after having been properly moistened and while moving in free and continuous flow, to a succession of breaking or splitting operations, whereby the kernels are broken into fragments of a size to insure the detaching of the germ from the starch-bearing portions, alternating with screening operations, whereby after each breaking such fragments of grain as are broken to the proper size, along with corresponding bits of germ and other bodies, are separated out and carried off from the still unreduced portion of the charge before the latter is subjected to the next succeeding breaking operation, and in our Letters Patent No. 707,057, of the same date, is described an apparatus adapted to carry out this step of the process.

My present invention is directed to an apparatus designed more particularly for the purpose above indicated; but which also may be used as a "degerminator" generally wherever its service may be called for, the said apparatus embodying in very compact and efficient form the same general combination and mode of operation as the aforesaid patented apparatus. By my present improvement I obtain an increase in yield of valuable products together with corresponding reduction of offal and feed and a larger percentage of whole and partially broken germs suitable for the production of maize oil.

I will first describe my improvement in connection with the accompanying drawings and will then point out in the claims those features which I believe to be new and of my own invention.

In the drawings, Figure 1 is a perspective view of a machine embodying the invention. Fig. 2 is a like view of the same with the upper half of the concave or casing removed. Fig. 3 is a longitudinal axial section of the toothed cylinder and the concave or casing which incloses it. Fig. 4 is a cross-section on line 4 6, Fig. 3. Fig. 5 is a cross-section on line 5 5, Fig. 3. Fig. 6 is a view of the end or tail piece of the machine, which is applied to the tail of the cylinder and is provided with regulable discharge-openings, as hereinafter set forth. Fig. 7 is an enlarged cross-section on line 7 7, Fig. 6. Fig. 8 is a view of the bottom half of the "concave."

A is the supporting-frame, of any suitable construction. Secured to the frame is the concave or jacket B. Within the concave is the rotary "cylinder" C, fast on shaft D, which latter extends through and beyond the concave A, its ends supported in suitable bearings D' and being provided with a pulley $D^2$ for driving it. The shaft is capable of slight longitudinal movement for adjusting the cylinder within the concave, as customary in this class of machines, and is provided for this purpose with an adjusting-lever $D^3$ and any suitable connection between it and the shaft—such, for example, as set forth in Letters Patent No. 707,057, above referred to. The interior of the concave as well as the exterior of the cylinder are armed with teats or projections of conical or other suitable form, as shown. These teats are arranged, as usual, on spiral lines in such direction as to tend to feed the grain toward the tail or discharge end of the machine, the teats on the concave passing between those on the cylinder. They are designed to break or split the kernels in contradistinction to grinding or crushing them. The valve-controlled pipes S' $S^2$ $S^3$, &c., opening into the interior of the concave, have the same function as the like-lettered parts in said Letters Patent No. 707,057—viz., to supply moisture to the material under treatment at the various points in the apparatus where it is likely that the material may need to have additional moisture supplied to it in order to replace the loss due to the heat of attrition and other causes during the progress of the material through the apparatus.

Having described the general structure of the apparatus, I now proceed to a description of those features in it which more particularly characterize my present improvement.

The cylinder C, for the purposes hereinafter indicated, becomes gradually less in diameter toward the tail or discharge end. The concave or jacket B is correspondingly shaped, and it has at intervals through its length screens or perforated sections E' E² E³, &c., in its under half, which are arranged immediately over and so as to discharge into hoppers and spouts F' F² F³, one for each section, so that the material passing through any one screen will be kept separated from what passes through the others. I here remark that all the screens have the same mesh or the same size of perforation, the object being to carry off from any and all points on the cylinder fragments of grain which will pass through the screen and such other parts as are of a size to pass through along with them. The object of the gradual reduction in diameter of the cylinder and concave is twofold: First, to concentrate the material as it is lessened in bulk by the discharge of properly broken or disintegrated parts through the successive screens, thus insuring uniformity of action and treatment, and, secondly, to reduce the peripheral speed of the cylinder and consequently the vigor of the treatment as the material approaches a finished condition, it being obvious that after the grain has once been partly broken and reduced in the apparatus a less severe treatment is required, such conditions obtaining in increasingly greater degree until what is left of the material in the jacket or concave is finally discharged at the tail.

The cylinder C can conveniently be made of a plurality of sections C' C², &c., each less in diameter than the preceding one, each section abutting against the other and being provided internally with a spider, by which it is made fast to the shaft. The concave also can be made in corresponding sections, as shown, bolted together by bolts passing through abutting flanges on their exterior. It is preferred that these sections in both the cylinder and the concave shall be of frusto-conical shape or gradually taper toward the tail of the machine. In the particular structure represented in the drawings the first section in both the cylinder and the concave is truly cylindrical. The other sections are frusto-conical, and there is one screen E' E², &c., for each section. The concave is closed at its discharge end by a "tail-plate" G, removably attached to it and formed with one or more discharge-openings g, provided with slides or gates g' for the purpose of regulating the discharge of the material therethrough, so that it may be just as rapid and free as the passage of the material into and through the machine, the object being to insure the same free and uninterrupted flow of the material through and out from the machine as is aimed at in Letters Patent No. 707,057, aforesaid. I prefer for this purpose to have four openings g in the tail-plate, arranged as represented in the drawings, each having its own gate g'. The first section C' of the cylinder is armed, as shown, with spirally-arranged ribs or projections c, on which are located the teats or projections c', this construction being similar to that employed in well-known types of breaking or disintegrating machines now in use; but obviously any similar construction answering the same purpose can be substituted. The sections of both the cylinder and the concave are removable, so that should occasion require one or more of the tail-sections can be removed, the machine being thus correspondingly shortened. In this event, of course, a tail-plate G of correspondingly greater diameter would be required in order to close the discharge end of the concave.

The concave is divided lengthwise and horizontally into two halves, bolted or otherwise detachably fastened together, so as to allow the upper half to be removed whenever it is desired to have access to the interior of the machine.

The grain to be treated is fed into the first section of the concave through a suitable spout or conduit H.

The several sections of the cylinder and the concave, together with the screens appropriate thereto, correspond in a general way each to one of the several sets of breaking and screening devices set forth in Letters Patent No. 707,057, the material broken or reduced to the proper size in any one section passing off through the screen and hopper-spout appropriate to that section, while the remaining and insufficiently-reduced material passes along to the next section for further like treatment and separation.

The operation is as follows: The grain after having been previously treated and brought to proper condition to be degerminated (preferably as described in Letters Patent No. 707,058, hereinbefore mentioned) is allowed to flow into the machine through spout H, which discharges it into the first section of the machine, where it is acted upon, scoured, and partially broken. The fine dirt, meal, and broken bits of germ and other material of proper size pass off through the screen E' of this section and are carried off through hopper-spout F' appropriate to that screen, while the grain, now somewhat reduced in bulk, passes along to the next succeeding and smaller section, in which it is slightly concentrated, corresponding to its loss in bulk, and is further treated or broken. The material which is properly reduced in this section (together with smaller particles, such as meal, &c., resulting from the breaking operation) passes off from the machine through the screen E² and spout F² appropriate to said section, while the remainder passes along the next succeeding section, where it is still further concentrated to compensate for its further loss of bulk and is similarly treated, and so on until it reaches the tail of the machine, where such of the material (consisting mainly of hominy and coarse germs) as has not been screened off in the machine is discharged through the openings $g$ in the tail-plate G. The material carried off from the machine through each screen and spout is kept distinct and separate from the others and is assembled, screened, and winnowed and separated in the customary way. The material carried off from the machine by each screen and spout, &c., is of better quality than that carried off by the preceding screen and spout, the last—that is, the material passing off through screen $E^4$ and spout $F^4$—being of excellent quality.

Having described my improvement and the best way now known to me of carrying the same into practical effect, I would state in conclusion that I do not restrict myself to the structural details hereinbefore set forth in illustration of the improvement, for obviously the same can be varied considerably without departure from the spirit of my invention; but

What I claim herein as new, and desire to secure by Letters Patent, is as follows:

1. In apparatus for degerming maize, a rotary power-driven "cylinder" composed of a plurality of externally-toothed sections decreasing in diameter as they approach the tail of the machine, in combination with a stationary "concave" or surrounding jacket, composed of corresponding sections armed internally with teeth to coöperate with those on the "cylinder-sections," and a screen in the lower portion of each section of the "concave," substantially as and for the purposes hereinbefore set forth.

2. In apparatus for degerming maize, and in combination, a rotary power-driven "cylinder" composed of a plurality of externally-toothed sections decreasing in diameter as they approach the tail of the machine; a stationary "concave" or surrounding jacket, composed of corresponding sections armed internally with teeth to coöperate with those on the "cylinder-sections;" a screen in the lower portion of each section of the "concave;" means for feeding the material into the front section of the "concave;" and a "tail-plate" closing the tail of the "concave" and provided with discharge-openings, and means for closing the same more or less as desired, substantially as and for the purposes hereinbefore set forth.

In testimony whereof I have hereunto set my hand this 1st day of November, 1902.

JOSEPH F. GENT.

Witnesses:
   LOUIS MATT,
   ANA MATT.